May 27, 1924.
C. C. QUALE
SYRINGE
Filed Sept. 19, 1923
1,495,924
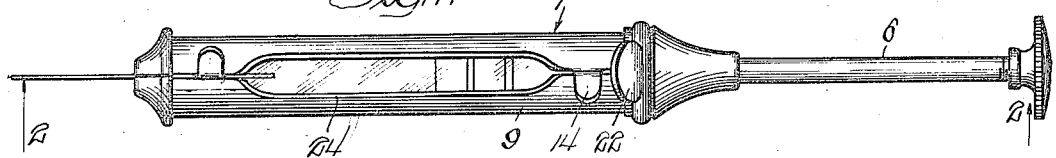
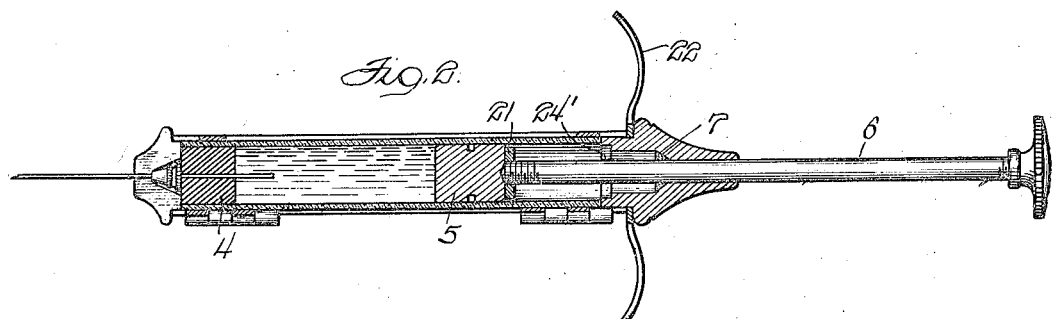
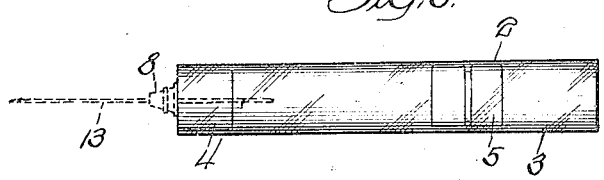
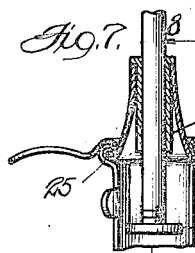
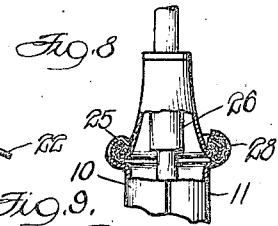
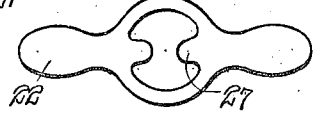
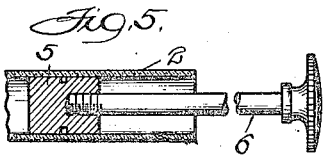
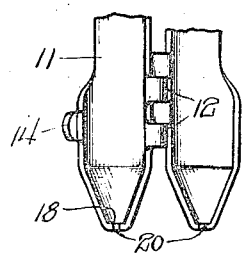
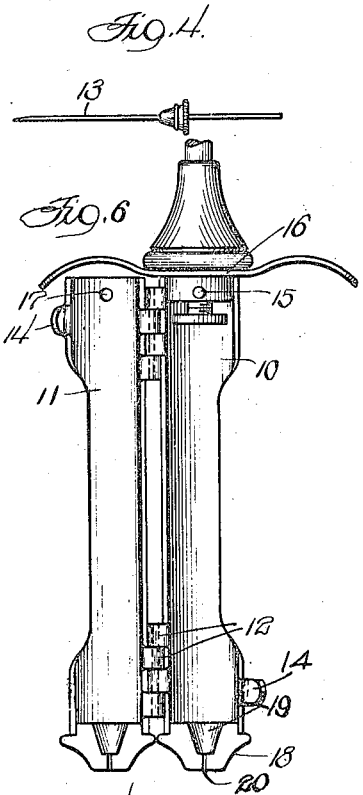
Inventor:
CARLE C. QUALE Patented May 27, 1924.

1,495,924

UNITED STATES PATENT OFFICE.

CARLE C. QUALE, OF CHICAGO, ILLINOIS.

SYRINGE.

Application filed September 19, 1923. Serial No. 663,522.

*To all whom it may concern:*

Be it known that I, CARLE C. QUALE, a citizen of the United States, residing at Chicago, in the county of Cook and State of Illinois, have invented new and useful Improvements in Syringes, of which the following is a full, clear, concise, and exact description, reference being had to the accompanying drawing, forming a part of this specification.

My invention relates to hypodermic syringes.

More particularly, my invention is an improvement over the prior art type of syringe in that it allows more complete asepsis, greater rapidity of operation, extreme simplicity in manufacture and operation and a considerable saving in materials, usually discarded, being characterized, among other features, by a novel form of holder for carrying the capsule containing the serum, or other material intended for injection.

Hypodermic injections consist of two different types of material. First, of water solutions of morphine, adrenalin, novocain, etc., commonly used by physicians, hospitals and dentists. Second, of serums usually from horses, which are more dense solutions. Injections of the first class are usually prepared just prior to administration with a considerable loss of time due to the required sterilization of the syringe, needle and solution to be injected. With the ordinary physician, dentist or nurse, it requires fully fifteen minutes to make these preparations carefully and even then there is often serious loss of effectiveness from leaky or otherwise defective syringes. Serums are usually prepared long in advance, and, to be ready for immediate use, must be put up in special syringes complete with plunger, needle, etc., which, in the smaller sizes at least, cost far more than the enclosed serum, and which are discarded immediately. A syringe embodying my invention overcomes the above difficulty. Complete asepsis can be assured by careful sterilization under strict laboratory conditions. In using the syringe, that portion of the needle which enters the skin of the patient is not contaminated by being passed through any non-sterile portion of the syringe.

In emergencies requiring the use of drugs to preserve life or relieve intense pain, the rapidity of administration is an important factor. With the use of a syringe embodying my invention, the usual time required can be reduced to one to two minutes. The syringe may be manufactured and operated with great economy. Antitoxic serums can be enclosed rapidly and economically in the capsules used in my syringe. These capsules may be stored in comparatively small space, transported at low cost and administered with ease and rapidity. There will also be a considerable saving from the fact that the capsule alone is discarded, instead of the complete syringe under the present practice.

According to the teachings of my invention, I propose to overcome the above difficulties in the administration of injections by providing an improved form of holder for the serum retaining capsule, and to provide these capsules, as above set out, in either case, ready for use, requiring but the insertion of the same in the holder, whereupon the injection may be given, the time required being but a matter of not more than a minute or so. Hence it will be noted that, apart from an economical standpoint, the employment of my invention will effect a considerable saving in time and alleviate human suffering to an untold extent, in that an injection may be given as soon as the patient arrives at the hospital.

The advantages economically accruing from the use of my device will be apparent when it is pointed out that only the capsule need be thrown away each time, and a considerable saving is thereby had, in that the plunger, usually made of metal and relatively costly as compared to serum itself, may be saved and used as long as the syringe itself.

My invention more particularly resides in the form of holder employed. Being in the shape of a cylinder or barrel, I preferably provide it split along its medial plane, so that the capsule may be laid therein in a radial direction as distinguished from an axial direction. A further improvement resulting from said split form of barrel resides in the manner of carrying the needle. The seat for the needle is also split and a groove is provided therein for the reception of the needle. This groove is in the plane of the severance or split, and, therefore, may be readily kept clean and the needle permitted to be inserted in the capsule before laid in the holder.

Other novel details in the construction and arrangements of a structure embodying my invention will be apparent from the following specification, when read in connection with the accompanying drawings forming a part thereof, and wherein a preferred form of my device is illustrated. It is to be understood, however, that the invention is not to be restricted to the specific embodiment shown, because, as will be obvious, other arrangements may be had without, in the least, departing from the spirit of the invention.

In the drawings:

Figure 1 is a front elevation of a device embodying my invention;

Fig. 2 is an axial longitudinal section, taken on the line 2—2 of Fig. 1;

Fig. 3 is a view of a capsule;

Fig. 4 is a detail view of a needle;

Fig. 5 is a sectional detail view of a modification, illustrating the manner of engaging the tip of the plunger rod with a piston which normally forms an end stopper or closure for the capsule, in cases where the closure sticks and cannot be easily moved by the plunger;

Fig. 6 is an elevation of the holder with its cover in open position;

Fig. 7 is a detail sectional view of a modified form of construction, illustrating the manner of forming the head portion as a stamping;

Fig. 8 is a similar view but taken at right angles to Fig. 7;

Fig. 9 is a detail view of the finger grip; and,

Fig. 10 is a detail sectional view of a modified form of construction, also being preferably a stamping and having the needle seat made integral with the barrel.

The device embodying my invention comprises a holder 1 in which a capsule 2 is adapted to be inserted. The capsule 2, as illustrated in Fig. 3, ordinarily comprises a glass tube 3, the serum or other injectable fluid being confined between the end stoppers or closures 4 and 5. The closure 4 serves to receive a needle 13, while the closure 5 serves as a piston head of a plunger 6 carried in a head portion 7. As will be later pointed out, capsules of this character are sold with the fluid therein and whenever an injection is to be given the proper form of needle may be selected and inserted at the end having the closure 4, by being pushed through the center of the same until an abutment 8 on the needle comes against the outer face of this closure. As hereinbefore mentioned, the holder 1 is in the form of a split barrel 9 comprising a stationary portion 10 and a hinged door or cover 11. Barrel 9 may be made in any desirable manner, but I preferably provide it in the form of a stamping, which permits the hinges 12 to be formed integrally with the stationary portion 10 and the movable cover 11. As is well known, this provides for an economy in the manufacture of the device inasmuch as it eliminates welding or riveting of the hinges and at the same time provides for a stronger construction. Also formed integrally with the hinge cover 11 are the catches 14.

As will be seen in Fig. 6, a pin 15 projects slightly from the periphery of a shank 16, forming a part of the head portion 7. The cover 11 at its upper end is fitted with an aperture 17 adapted to cooperate with the pin 15 when the cover is closed, whereby the cover may be firmly retained in closed position and prevented from accidentally opening. In order to open the cover 11, the catches 14 may be engaged by the finger and pushed slightly outwardly, whereupon the aperture 17 will be freed from engagement with the pin 15. The cover 11 will then swing to the position shown in Fig. 6.

A split seat 18 is provided at one end of the barrel. This seat is formed with a recess 19 for receiving the abutment 8 of the needle, and also with a groove 20 in which the needle lies. It will be noted that in view of the seat being split, preferably along its medial plane, (that is, a plane through its longitudinal axis) access may be obtained to the recess 19 and the groove 20, whereby these may be kept clean and the needle allowed to be inserted in the capsule before the latter is placed in the barrel 9. I consider this split feature of the needle seat 18 of considerable importance in that it also provides for a substantial support for the needle while the syringe is being used, and renders the syringe completely aseptic.

The piston rod 6 is slidably movable in the head portion 7. The end stopper or closure 5 preferably serves as the piston of the plunger, being engaged by a disc 21 threaded on the inner end of the rod 6. The manner in which the plunger engages the end stopper 5 is clearly shown in Fig. 2. However, in case the plunger 5 sticks and does not readily move along the interior of the glass tube 3, the disc 21 may be unthreaded from the rod 6. Then, by threading the rod 6 into the end stopper 5 and turning it several times, as is shown in Fig. 5, it will be found that the stopper may be loosened and thereupon pushed forwardly to discharge the fluid through the needle 6. The barrel 9 is preferably of a length equal to that of the capsule so that the latter will snugly fit therein. In order that this may be accomplished, a recess 24' is formed at the inner end of the head portion 7 to accommodate the disc 21 when the plunger is pulled to its outer position.

I preferably make the end portion 7 and the needle seat 18 separate from the barrel 9. However, I do not intend to be limited to this construction, and furthermore I have found it possible to form the needle seat integrally with the barrel when desired.

A finger grip 22 is tightly fitted over the shank 16 of the head portion 7. This allows two of the fingers of the hand to grasp the holder firmly, while another finger, say the thumb, engages the button of the plunger to push it forwardly during the operation.

In view of the holder being a stamping it may readily be fitted with a sight opening 24 so that the attendant may observe the amount of the serum injected in the patient, by the position of the plunger stopper within the capsule.

As stated above, I contemplate making the barrel a stamping, and possibly form the needle seat 18 integral therewith. In Fig. 10, I have illustrated such an arrangement. In this case, the barrel 9 is also split substantially along its medial plane, with the cover 11 hinged to the stationary part 10. The lower ends of these two members have been drawn to form a point, which, at the extreme tip, is apertured, or otherwise formed with the groove 20, in which needle 13 is adapted to fit. By this construction it will be noted that various modifications are possible, and at the same time embody the principles of the present invention.

Figs. 7 and 8 illustrate this form of construction as employed at the upper or plunger end of the syringe. The barrel 9 is rolled to form an annular bead 25. The lower end of the head portion 7, now in the form of a sheet metal stamping, is interlocked within the bead 25, while a tube 26 is suspended from the upper or top end of this head portion 7 for guiding the plunger rod 6 in its longitudinal movement. Finger grip 22, as shown in Fig. 10, is stamped preferably with two inwardly projecting lips 27, which are adapted also to interlock with the annular bead 25, for holding the finger grip 22 in position, this being clearly shown in Fig. 7.

In this form, I omit the aperture 17 in the cover and the pin 15 on the shank 16, and substitute instead, as the means for locking cover 11 in closed position, a bead or rolled portion 28 on the upper end of the cover which fits over bead 25 in snapped relation, thereby further strengthening this part of the syringe and making it capable of better withstanding any strain resulting from an effort to move a piston stopper 5 which has become stuck in its capsule.

In making the present type of syringe a stamping proposition, it is apparent that such details of construction may readily be varied and therefore, I do not desire to limit myself to the forms shown herein.

It will be noted that an advantage may be obtained in the use of my device for performing blood tests. This is accomplished by removing the disc 21 from the threaded end of the plunger rod 6 so that this threaded end may be screwed into the stopper 5 as shown in Fig. 5. In performing blood tests empty capsules made specially for this purpose (being of the same construction) are inserted in the barrel so that the end of the plunger rod may be attached to the stopper 5, as in the manner described. Drawing the plunger outwardly away from the needle end of the capsule will cause a suction in the capsule. In this manner, blood from the body of the patient may be drawn in the capsule and there held free from all contact with bacteria and other foreign matter until analyzed in the laboratory. I wish to point out that my device is also aseptic in performing blood tests, and that there is no possibility of bacteria in the blood contaminating the syringe during this operation. The blood is held intact and is delivered in the same condition as it was taken from the body to the laboratory for analysis. Although certain prior art devices permit the withdrawal of blood from the body of the person, so far as I am aware none of these contemplates drawing blood directly into and preserving it intact within a capsule.

Without further elaboration, the foregoing will so fully explain the gist of my invention, that others may, by applying current knowledge, readily adapt the same for use under varying conditions of service, without eliminating certain features which may properly be said to constitute the essential items of novelty involved, which items are intended to be defined and secured to me by the following claims:

I claim:—

1. A syringe of the type described comprising a barrel having a substantially closed chamber, a plunger slidably movable therein from one end, a needle seat positioned at the opposite end for receiving a needle carried by a fluid containing capsule provided with movable fluid ejecting means cooperating with said plunger, and a cover carried by said barrel and seat whereby said capsule and needle may be inserted in a radial direction in said barrel and said seat.

2. A syringe of the type described comprising a substantially closed barrel, a head portion fitted at one end and carrying in slidable relation a plunger rod, a needle seat at the opposite end from which a needle is adapted to project, said barrel adapted to receive against the needle end a fluid containing capsule carrying a needle, and means permitting said barrel and said seat to open along its medial plane.

3. A syringe of the type described comprising a closed barrel adapted to receive against the needle end a fluid containing capsule, and means for permitting said barrel to open substantially along its medial plane to permit the insertion of said capsule.

4. A syringe of the type described comprising a barrel adapted to receive against the needle end a fluid containing capsule having a needle at one end thereof, a seat for said needle fitted into said barrel at one of its ends, and means for opening said barrel including said seat substantially along its medial plane to permit the insertion of said capsule.

5. A syringe of the type described comprising a barrel adapted to receive against the needle end a fluid containing capsule, a plunger slidably carried at one end of the syringe adapted to be moved inwardly for ejecting the fluid from the capsule, said barrel being split substantially along its medial plane and having one-half thereof hingedly connected to serve as a cover to permit the insertion and removal of the capsule into and out of said barrel.

6. A syringe of the type described comprising a barrel adapted to receive a removable container providing end closures, one of which moves longitudinally therein and the other of which is adapted to receive a needle, a plunger cooperating with said first mentioned closure, said barrel having a longitudinal cover whereby said container may be inserted into said barrel.

7. A syringe of the type described comprising a barrel, said barrel formed of a stationary portion and a hingedly connected cover, and longitudinal hinge members formed on said stationary portion and said cover.

8. A syringe of the class described comprising a barrel, said barrel formed of a stationary portion and a cover interconnected by a longitudinal hinge, and means comprising projecting catches for opening and closing said cover.

9. A syringe of the type described comprising a substantially closed barrel including a cover and adapted to receive a capsule against the needle end, and means to attach said cover to said barrel in a plane including the longitudinal axis of said barrel.

10. A syringe of the type described including a barrel having a substantially closed stationary chamber into which a capsule is adapted to be radially inserted and held in non-movable relation, said capsule having a piston at one end and a needle at the other end, means for moving said piston forwardly for ejecting the contents and rearwardly for filling the capsule, and a cover on said barrel for clampingly holding the capsule within said chamber.

11. A syringe of the character described, comprising a substantially closed barrel adapted to receive a capsule containing a liquid ejecting means at one end and a needle at the other end, a cover for said barrel permitting side loading of the said capsule, and means adapted to advance said liquid ejecting means toward said needle.

12. A syringe of the character described comprising a barrel divided on a longitudinal plane into two substantially equal parts, means interconnecting said parts whereby said barrel may be opened to receive a fluid containing capsule against the needle end, and means associated with said barrel adapted to eject said fluid through said needle.

13. A syringe of the character described comprising a barrel consisting of two parts, means adapted to longitudinally interconnect said parts, said barrel adapted to receive a fluid containing capsule and a needle when opened radially and to enclose said capsule when said barrel is closed, and means adapted to eject said fluid from said capsule through said needle.

14. A syringe of the type described, comprising a closed barrel adapted to receive against one end a fluid-containing capsule having a needle at the corresponding end, said barrel being so divided on a longitudinal plane that the capsule with its needle may be inserted into the barrel by radial movement.

15. A syringe of the character described comprising a barrel adapted to receive a fluid containing capsule provided with a non-tiltable closure at one end and a needle at the opposite end, means for moving said closure longitudinally in said capsule for ejecting the fluid, and cover means for permitting the insertion of said capsule by radial movement in said barrel.

16. A syringe of the character described comprising a barrel adapted to receive a capsule containing a fluid ejecting means at one end and a needle at the opposite end, a cover for said barrel permitting radial insertion of said capsule, and means for moving said fluid ejecting means longitudinally in said capsule for ejecting the fluid, said fluid ejecting means adapted to maintain substantially at all times an axis coincident with that of said barrel.

In witness whereof, I have hereunto subscribed my name.

CARLE C. QUALE.